United States Patent
Ikeda et al.

(10) Patent No.: US 11,182,626 B2
(45) Date of Patent: Nov. 23, 2021

(54) ATTACHED OBJECT DETECTION APPARATUS

(71) Applicant: DENSO TEN Limited, Kobe (JP)

(72) Inventors: Nobuhisa Ikeda, Kobe (JP); Nobunori Asayama, Kobe (JP); Takashi Kono, Kobe (JP); Yasushi Tani, Kobe (JP); Daisuke Yamamoto, Kobe (JP); Tomokazu Oki, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 293 days.

(21) Appl. No.: 16/556,906

(22) Filed: Aug. 30, 2019

(65) Prior Publication Data
US 2020/0210723 A1 Jul. 2, 2020

(30) Foreign Application Priority Data
Dec. 28, 2018 (JP) .............................. JP2018-248531

(51) Int. Cl.
*G06K 9/00* (2006.01)
*G06K 9/46* (2006.01)
*G06T 7/11* (2017.01)
*G06T 7/136* (2017.01)

(52) U.S. Cl.
CPC ..... *G06K 9/00805* (2013.01); *G06K 9/00201* (2013.01); *G06K 9/4647* (2013.01); *G06K 9/4661* (2013.01); *G06T 7/11* (2017.01); *G06T 7/136* (2017.01); *G06T 2207/30261* (2013.01)

(58) Field of Classification Search
None
See application file for complete search history.

(56) References Cited

U.S. PATENT DOCUMENTS

2015/0125032 A1* 5/2015 Yamanaka ......... G06K 9/00624
382/103

FOREIGN PATENT DOCUMENTS

| JP | 2010-218046 A | 9/2010 |
|----|---------------|--------|
| JP | 2014-030188 A | 2/2014 |
| JP | 2018-191087 A | 11/2018 |

* cited by examiner

*Primary Examiner* — Matthew C Bella
*Assistant Examiner* — Brian D Shin
(74) *Attorney, Agent, or Firm* — Oliff PLC

(57) ABSTRACT

An attached object detection apparatus includes a setting part, a calculator, and a detector. A setting part sets a plurality of divided regions within a captured image captured by an image capturing apparatus. A calculator calculates, for each of the plurality of divided regions and based on luminance of pixels in the divided region, a representative luminance value and an amount of luminance dispersion. A detector detects, as an attached region that has an attached object, a divided region among the plurality of divided regions that satisfies the following conditions: i) a first difference is equal to or smaller than a first predetermined difference, ii) a second difference is equal to or smaller than a second predetermined difference, and iii) the representative luminance value of the current divided region is equal to or smaller than a first predetermined value.

10 Claims, 6 Drawing Sheets

ATTACHED OBJECT DETECTION APPARATUS

BACKGROUND OF THE INVENTION

Field of the Invention

The invention relates to an attached object detection apparatus and an attached object detection method.

Description of the Background Art

Conventionally, an attached object detection apparatus has been known that detects an object on a lens of an on-vehicle camera based on chronological change in luminance of a region generated by dividing an image captured by the camera.

However, in the conventional technology, for example, in a case where a gain of the camera is adjusted, even when the object is on the divided region, the luminance of the divided region changes. Thus, in a case of the conventional technology, it may be impossible to accurately determine whether or not an attached object is on.

SUMMARY OF THE INVENTION

According to one aspect of the invention, an attached object detection apparatus includes: a setting part that sets a plurality of divided regions within a captured image captured by an image capturing apparatus; a calculator that calculates, for each of the plurality of divided regions and based on luminance of pixels in the divided region, a representative luminance value and an amount of luminance dispersion; and a detector that detects, as an attached region that has an attached object, a divided region among the plurality of divided regions that satisfies the following conditions: i) a first difference is equal to or smaller than a first predetermined difference, the first difference being a difference between a previous representative luminance value of a previous divided region and a current representative luminance value of a current divided region corresponding to the previous divided region, ii) a second difference is equal to or smaller than a second predetermined difference, the second difference being a difference between a previous amount of luminance dispersion of the previous divided region and a current amount of luminance dispersion of the current divided region, and iii) the representative luminance value of the current divided region is equal to or smaller than a first predetermined value.

Thus, it is possible to accurately determine whether or not the attached object is on the image capturing apparatus.

Therefore, an object of the invention is to provide an attached object detection apparatus and an attached object detection method of accurately determining presence or absence of an attached object.

These and other objects, features, aspects and advantages of the invention will become more apparent from the following detailed description of the invention when taken in conjunction with the accompanying drawings.

DESCRIPTION OF THE EMBODIMENTS

With reference to the drawings, an attached object detection apparatus and an attached object detection method of this embodiment will be described below. The present application will not be limited by the description.

Figure 1:
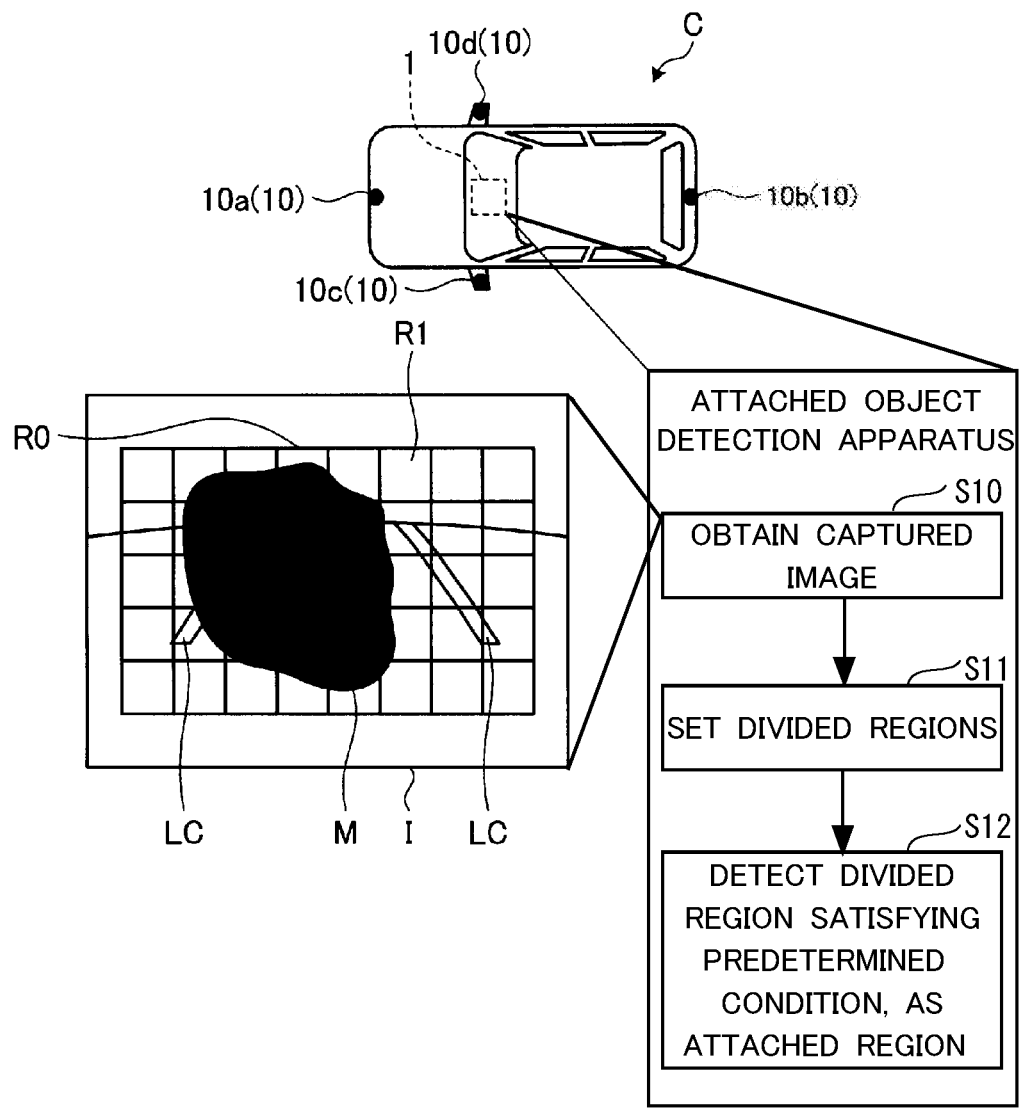
FIG. 1 illustrates an outline of an attached object detection method.

First, an outline of the attached object detection method of this embodiment will be described with reference to FIG. 1. FIG. 1 illustrates the outline of the attached object detection method. The attached object detection method of the embodiment is executed by an attached object detection apparatus 1.

The attached object detection apparatus 1 is mounted, for example, on a vehicle C, and detects an attached object on an on-vehicle camera 10 (image capturing apparatus), more specifically, attachment of the attached object on a lens of the on-vehicle camera 10. The on-vehicle camera 10 captures an image of surroundings of the vehicle C.

The on-vehicle camera 10 captures the images of the surroundings of the vehicle C. The on-vehicle camera 10 includes an image sensor, such as a charge coupled device (CCD) and a complementary metal oxide semiconductor (CMOS). The on-vehicle camera 10 includes, for example, a front camera 10a that captures an image showing an area in front of the vehicle C, a rear camera 10b that captures an image showing an area behind the vehicle C, and a left camera 10c that captures an image showing an area on a left side of the vehicle C, and a right camera 10d that captures an image showing an area on a right side of the vehicle C.

When an attached object M, such as mud, dust, and another light blocking object, is on the lens of the on-vehicle camera 10, there is a possibility that information about the surroundings of the vehicle C, such as a parking line LC, another vehicle, and a pedestrian cannot be obtained from a captured image I captured by the on-vehicle camera 10. Thus, the parking line LC, the another vehicle and the pedestrian, etc. may not be accurately detected. FIG. 1 illustrates an example of the captured image I showing the parking line LC and having mud as the attached object M on the lens of the on-vehicle camera 10. Examples of the attached object M include a rain drop, a snowflake, etc.

Therefore, a purpose of the attached object detection apparatus 1 of the embodiment is to accurately detect the attached object M on the lens of the on-vehicle camera 10.

The attached object detection apparatus 1 obtains the captured image I captured by the on-vehicle camera 10 (a step S10).

The attached object detection apparatus 1 sets a plurality of divided regions R1 within the target region R0 to be determined about whether the attached object M is on (attached) (a step S11). The target region R0 is a predetermined area of the captured image I, and when the attached object M is on the target region R, the attached object detection apparatus 1 cannot properly perform a process of detecting the parking line LC, autonomous parking process, etc. The target region R0 is, for example, rectangle shaped.

The plurality of divided regions R1 are formed by dividing the target region R0 in a longitudinal direction and in a lateral direction. The divided regions R1 include a plurality of pixels. For example, each of the divided regions R1 includes 40×40 pixels.

FIG. 1 illustrates an example of the captured image I having 40 divided regions R1, being divided into five in the longitudinal direction and into eight in the lateral direction. However, number of the divide regions R1 is not limited to 40.

Amongst the plurality of divided regions R1, the attached object detection apparatus 1 detects a divided region R1 satisfying a predetermined condition, as an attached region having the attached object M (i.e. to which the attached object M is attached) (a step S12). Details will be described later. The attached object detection apparatus 1 detects the attached region based on a counter value of the divided region R1.

In a case where the conditions (1) to (3) below are all satisfied, the attached object detection apparatus 1 determines that the divided region R1 satisfies the predetermined conditions, and detects the divided region R1 as the attached region. In a case where at least one of the conditions (1) to (3) is not satisfied, the attached object detection apparatus 1 determines that the divided region R1 does not satisfy the predetermined conditions, and detects the divided region R1 as an unattached region.

(1) A first difference is equal to or smaller than a first predetermined difference.

(2) A second difference is equal to or smaller than a second predetermined difference.

(3) A representative luminance value in the divided region R1 is equal to or smaller than a first predetermined value.

<Condition (1)>

The first difference is a difference in representative luminance value between the divided region R1 of a current captured image I1 (hereinafter referred to also as "current frame I1") and the divided region R1 of a previous captured image I0 (hereinafter referred to also as "previous frame I0) captured immediately before the current frame I1." Specifically, the representative value means an average value. The first difference is an absolute value. The first predetermined difference is an upper limit difference of the representative luminance value in a case where the attached object M is on the divided region R1. The first predetermined difference is preliminarily set based on an experiment and the like. The first predetermined difference is, for example, "five (5)."

The divided region R1 in the current frame I1 and the divided region R1 in the previous frame I0 are used to calculate the first difference and the second difference, and are located in a same position in the target region R0. Such divided regions R1 are referred to below as "same divided regions R1." In a case where the attached object M is on the lens, when a location of the vehicle C, i.e., an image capturing location, is changed, the first difference between the same divided regions R1 is small. The condition (1) is used to determine whether or not luminance change is small between the same divided regions R1.

<Condition (2)>

The second difference is a difference in amount of luminance dispersion between the same divided regions R1. Specifically, the amount of dispersion means standard deviation. The second difference is an absolute value. The second predetermined difference is an upper limit difference in the amount of luminance dispersion in a case where the attached object M is on the lens. The second predetermined difference is preliminarily set based on an experiment and the like. The second predetermined difference is, for example, "one (1)."

When the gain of the on-vehicle camera 10 is adjusted because background of the current frame I1 has changed from background of the previous frame I0, there is a case in which the representative luminance value changes between the same divided regions R1. The condition (2) is used to control an influence of gain adjustment of the on-vehicle camera 10.

<Condition (3)>

Figure 2:
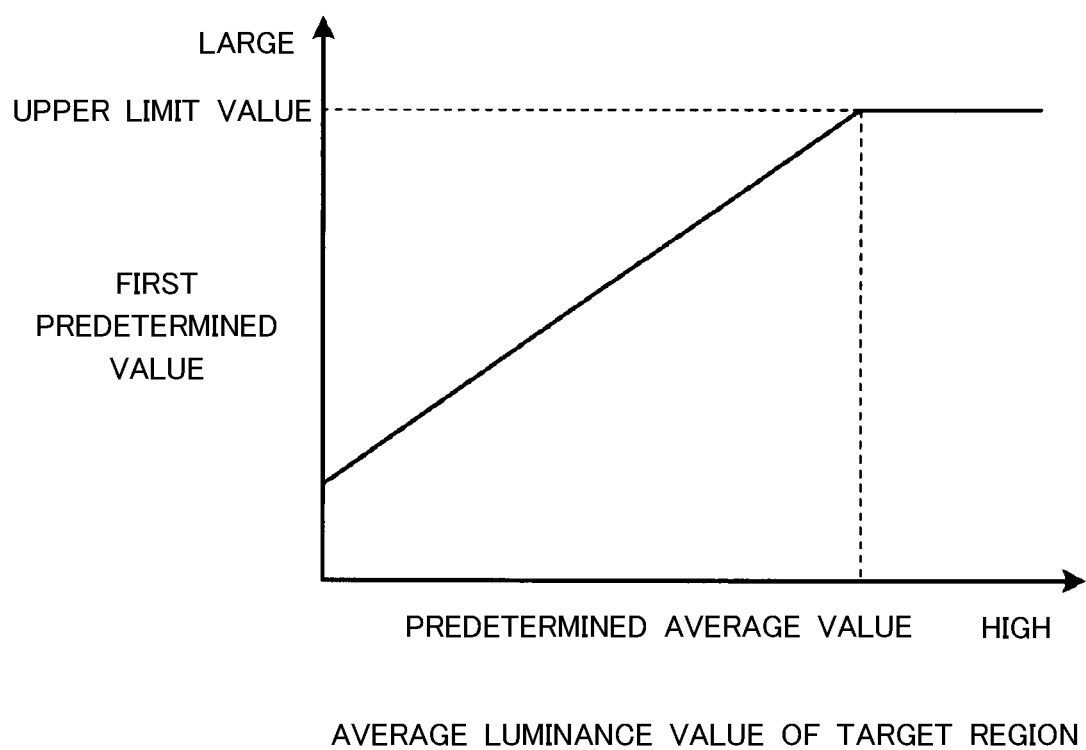
FIG. 2 illustrates a relationship between a representative luminance value of a target region and a first predetermined value.

The representative luminance value of the divided region R1 is a representative luminance value of the divided region R1 in the current frame I1. Being similar to the condition (1), specifically, the representative value means an average value. The first predetermined value is a value that can be used to determine that the attached object M is on the divided region R1. As shown in FIG. 2, the first predetermined value is set based on the representative luminance value of the target region R0 in the current frame I1. FIG. 2 illustrates a relationship between the representative luminance value of the target region R0 and the first predetermined value. The first predetermined value becomes greater as the representative luminance value of the target region R0 increases. Moreover, an upper limit is set to the first predetermined value. Thus, when the representative luminance value of the target region R0 is equal to or greater than the predetermined representative value preliminarily set, the representative luminance value of the target region R0 is set to the upper limit value.

In a case where the gain of the on-vehicle camera 10 is adjusted and then luminance of the entire captured image I becomes high, the representative luminance value of the divided region R1 that is the region having the attached object M also becomes higher. Thus, the first predetermined value is set based on the representative luminance value of the target region R0 in the current frame I1. The condition (3) is used to determine whether or not the luminance of the divided region R1 in the current frame I1 is low.

Since the attached object detection apparatus 1 detects, as the attached region, the divided region R1 satisfying the predetermined conditions, the attached object detection apparatus 1 accurately determines the divided region R1 having the attached object M, and accurately detects the attached region. In other words, the attached object detection apparatus 1 accurately detects the attached object M on the lens of the on-vehicle camera 10.

Figure 3:
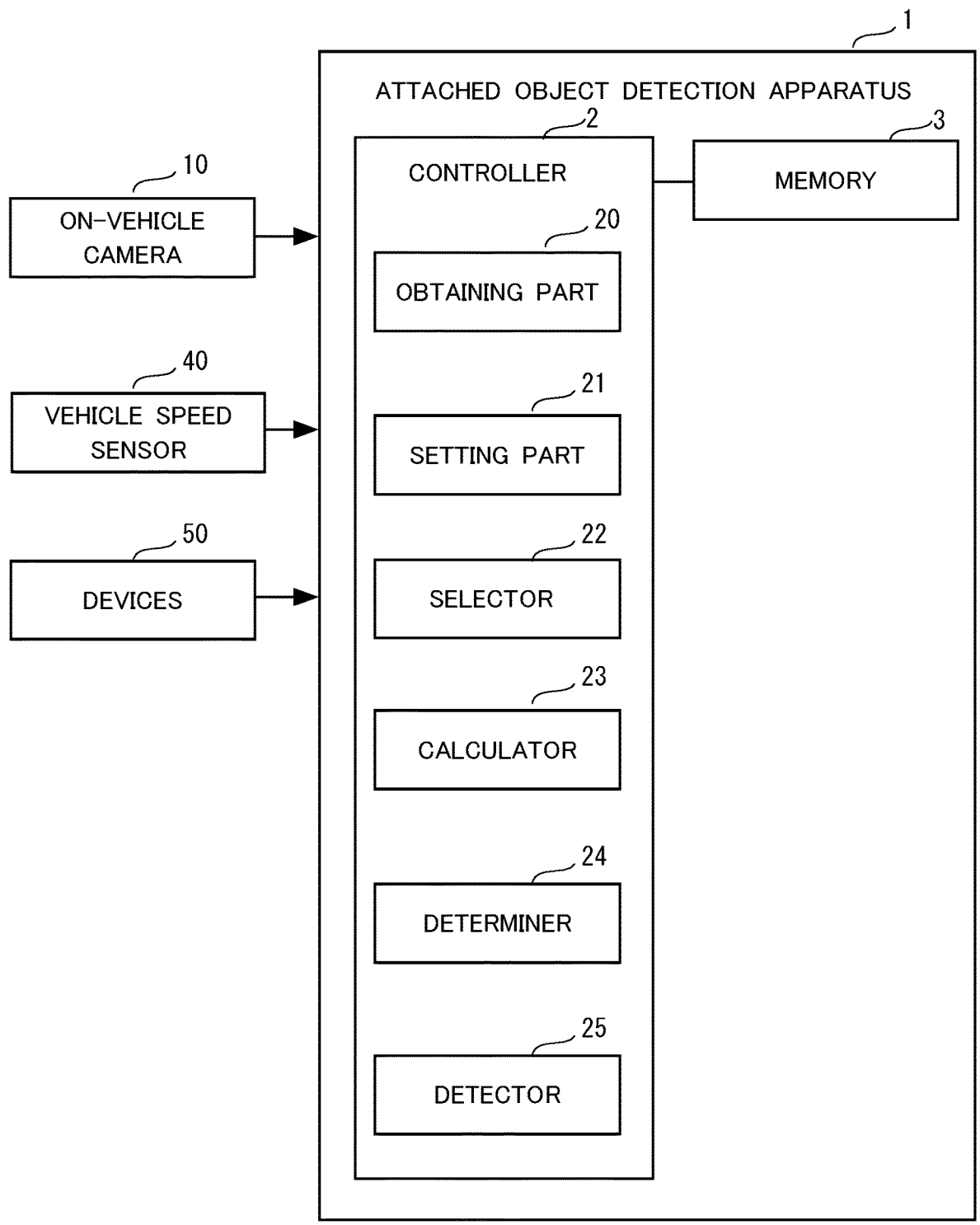
FIG. 3 is a block diagram illustrating a configuration of an attached object detection apparatus.

Next, with reference to FIG. 3, the attached object detection apparatus 1 will be described. FIG. 3 is a block diagram illustrating a configuration of the attached object detection apparatus 1.

The attached object detection apparatus 1 is connected to the on-vehicle camera 10, a vehicle speed sensor 40, and a variety of devices 50. FIG. 3 illustrates the configuration of the attached object detection apparatus 1 as a separate unit from the on-vehicle camera 10 and the devices 50. However, the configuration of the attached object detection apparatus 1 is not limited to this. The attached object detection apparatus 1 may be configured to be as one unit with the on-vehicle camera 10 or one of the devices 50.

The devices 50 obtain a detection result detected by the attached object detection apparatus 1 to perform various controls for the vehicle C. The devices 50, for example, include a display apparatus that gives information to a user about the attached object M on the lens of the on-vehicle camera 10 and gives a message to the user that the attached object M needs to be wiped. Other examples of the devices 50 are a removal apparatus that removes the attached object M from the lens by ejecting fluid, air, or the like toward the lens, and a vehicle control apparatus that controls autonomous driving of the vehicle C, etc.

The attached object detection apparatus 1 includes a controller 2 and a memory 3. The controller 2 includes an obtaining part 20, a setting part 21, a selector 22, a calculator 23, a determiner 24, and a detector 25.

Here, the attached object detection apparatus 1 includes, for example, a computer and other circuits. The computer includes a central processing unit (CPU), a read only memory (ROM), a random access memory (RAM), a data flash, an in/out port, etc.

The CPU of the computer functions as the obtaining part 20, the setting part 21, the selector 22, the calculator 23, the determiner 24, and the detector 25 of the controller 2, by reading out and executing a program stored, for example, in the ROM.

Moreover, at least one or all of the obtaining part 20, the setting part 21, the selector 22, the calculator 23, the determiner 24 and the detector 25 of the controller 2 may be configured by hardware, such as an application specific integrated circuit (ASIC) and field programmable gate array (FPGA). Moreover, each of the obtaining part 20, the setting part 21, the selector 22, the calculator 23, the determiner 24, and the detector 25 may be combined with one another or may be divided into two or more.

The obtaining part 20 obtains a vehicle speed based on a signal from the vehicle speed sensor 40. Moreover, the obtaining part 20 obtains the images captured by the on-vehicle camera 10 to generate the current frame I1 that is a current captured image I. More specifically, the obtaining part 20 performs grayscale processing that converts pixels of the captured image into gray level from white to black based on luminance of the pixels of the captured image. Moreover, the obtaining part 20 performs downsampling of the pixels of the captured image to generate an image having a reduced size as compared to the captured image.

Further, the obtaining part 20 generates an integral image from values of the pixels and an integral image from square values of the pixels, based on the downsampled captured image. The value of a pixel means information about luminance and edge of the pixel. As a result, since the attached object detection apparatus 1 performs downsampling of the captured images and generates the integral images, the attached object detection apparatus 1 speeds up calculation in a later process so that the attached object M can be detected in a shorter processing time period.

The obtaining part 20 may perform a smoothing process of the pixels, using a smoothing filter, such as an averaging filter. Further, the obtaining part 20 may generate (obtain) the current frame I1 having a same size as a size of the captured image, without performing downsampling.

The setting part 21 sets the target region R0 and the plurality of divided regions R1 in the current frame I1. The setting part 21 sets the target region R0 and the plurality of divided regions R1 to predetermined positions on the captured image I.

Further, the setting part 21 sets the first predetermined value. More specifically, the setting part 21 sets the first predetermined value based on the representative luminance value of the target region R0.

The selector 22 selects one of the plurality of divided regions R1 to determine whether or not the selected divided region R1 satisfies the predetermined conditions. More specifically, the selector 22 selects the divided region R1 that has not been determined about whether or not the predetermined conditions are satisfied, amongst the plurality of divided regions R1 in the current frame I1.

The calculator 23 detects luminance for each of the pixels included in the target region R0 in the current frame I1. Then, the calculator 23 calculates the representative luminance value and the amount of the luminance dispersion of the target region R0 in the current frame I1. Moreover, the calculator 23 calculates the representative luminance value and the amount of the luminance dispersion for each divided region R1 in the current frame I1. The representative luminance value means representative value in luminance distribution of the target region R0. More specifically, an average value is used as the representative luminance value. In addition to the average value, trimmed mean, median value, or norm may be used. The amount of dispersion is a value indicative of distribution range of the luminance of the pixels in the target region R0. More specifically, standard deviation is used to show the amount of dispersion. In addition to the standard deviation, dispersion, greatest/smallest range, quartile range, or arbitration percentile range may be used. The average value and the standard deviation are used below as the representative value and the amount of dispersion, respectively.

The calculator 23 calculates the first difference, a difference in average luminance value, between the same divided regions R1. In other words, the calculator 23 calculates the first difference between a previous average luminance value and a current average luminance value of the divided regions R1 corresponding to each other.

The calculator 23 calculates the second difference, a difference in luminance standard deviation, between the same divided regions R1. In other words, the calculator 23 calculates the second difference between a previous luminance standard deviation and a current luminance standard deviation of the divided regions R1 corresponding to each other.

Further, the calculator 23 calculates the counter value of the divided region R1. More specifically, in a case where the divided region R1 in the current frame I1 has been determined to satisfy the predetermined conditions, the calculator 23 increases the current counter value. In a case where the divided region R1 in the current frame I1 has been determined not to satisfy the predetermined conditions, the calculator 23 decreases the current counter value, i.e., the calculator 23 updates the counter value of the divided region R1 based on whether or not the divided region R1 satisfies the predetermined condition.

The counter value is increased in the case where the divided region R1 has been determined to satisfy the predetermined conditions, and the counter value is decreased in the case where the divided region R1 has been determined not to satisfy the predetermined conditions. In other words, the counter value indicates continuity of a determination that the divided region R1 is satisfying the predetermined conditions.

A predetermined upper limit counter value and a predetermined lower limit counter value are provided to the counter value. Further, a value to be added to the counter value may be same as or different from a value to be decreased from the counter value for each determination.

The calculator 23 calculates an occupation percentage that is a ratio of the attached region to the target region R0. The occupation percentage is calculated by dividing a sum of areas of one or more attached regions, the divided regions R1 having the attached object M, by an area of the target region R0. The occupation percentage may be calculated by dividing number of the attached regions by number of the plurality of divided regions R1 within the target region R0. The occupation percentage is expressed by, for example, percentage.

Figure 4:
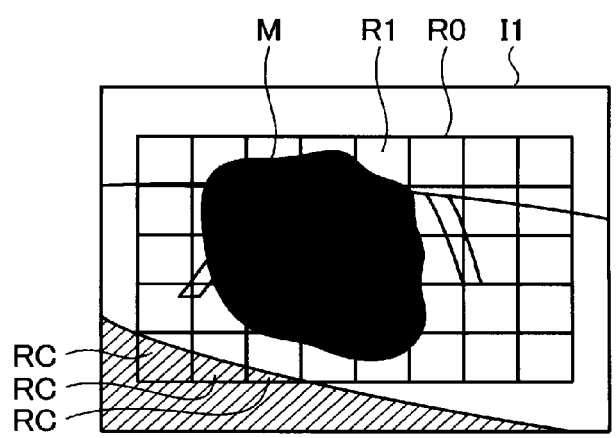
FIG. 4 is an example of a captured image captured by a left camera.

As shown in FIG. 4, in a case where the captured image I shows the host vehicle C (hatched region in FIG. 4), the captured image captured by, for example, the left camera 10c or the right camera 10d (see FIG. 1), the calculator 23 calculates the occupation percentage after excluding a divided region RC that shows the host vehicle C, from the divided regions R1. FIG. 4 is an example of the captured image I captured by the left camera 10c. In this embodiment, as shown in FIG. 4, only a small portion of the host vehicle C is included in the divided region R1, the divided region R1 is excluded. However, a degree of inclusion of the host vehicle in the divided region R1 may be arbitrarily set to exclude the divided region RC.

For example, in a case of the target region R0 having "40" divided regions R1 and "three (3)" divided regions RC showing a portion of the host vehicle C, the calculator 23 calculates the occupation percentage by dividing the sum of the areas of the attached regions by the area of the target region R0 having "37" divided regions R1.

In a case where one or more of the divided regions RC showing the host vehicle C are the attached regions, the areas of the divided regions RC are excluded from the sum of the areas of the attached regions. The divided regions RC showing the host vehicle C are predetermined.

The determiner 24 determines whether or not the vehicle speed is equal to or smaller than a predetermined vehicle speed. The predetermined vehicle speed is preliminarily set. The predetermined vehicle speed is a vehicle speed at which it is possible for the on-vehicle camera 10 to capture the captured image I having little blurring and detectably showing the attached object M. For example, the predetermine vehicle speed is 80 km/h.

The determiner 24 determines whether or not the current frame I1 is a low light image. More specifically, the determiner 24 determines i) the average luminance value of the target region R0 in the current frame I1 is equal to or smaller than a predetermined low illuminance value, and ii) the luminance standard deviation of the target region R0 in the current frame I1 is equal to or smaller than a predetermined low illuminance standard deviation. The predetermined low illuminance value is a predetermined value, for example, "85." Moreover, the predetermined low illuminance standard deviation is a predetermined value, for example, "50."

In a case where i) an average luminance value of the target region R0 in the current frame I1 is equal to or smaller than the predetermined low illuminance value, and ii) the luminance standard deviation of the target region R0 in the current frame I1 is equal to or smaller than the predetermined low illuminance standard deviation, the determiner 24 determines that the current frame I1 is the low light image. Further, in a case where the average luminance value of the target region R0 in the current frame I1 is greater than the predetermined low illuminance value, the determiner 24 determines that the current frame I1 is not the low light image, i.e., the current frame I1 is a non-low light image. In a case where the luminance standard deviation of the target region R0 in the current frame I1 is greater than the predetermined low illuminance standard deviation, the determiner 24 determines that the current frame I1 is the non-low light image.

Moreover, in a case where i) the vehicle speed is equal to or smaller than the predetermined vehicle speed, and ii) the current frame I1 is the non-low light image, the determiner 24 determines whether or not the divided region R1 in the current frame I1 satisfies the predetermined conditions. The determiner 24 determines whether or not the divided region R1 selected by the selector 22 satisfies the predetermined conditions. More specifically, in a case where i) the first difference is equal to or smaller than the first predetermined difference, ii) the second difference is equal to or smaller than the second predetermined difference, and iii) the average luminance value of the divided region R1 in the current frame I1 is equal to or smaller than the first predetermined value, the determiner 24 determines that the divided region R1 satisfies the predetermine conditions. Further, in a case where any one of the conditions (1) to (3) is not satisfied, the determiner 24 determines that the divided region R1 dissatisfies the predetermined conditions.

In a case where the vehicle speed is greater than the predetermined vehicle speed, or where the current frame I1 is the low light image, the determiner 24 does not determine whether or not the divided region R1 in the current frame I1 satisfies the predetermined conditions.

The determiner 24 determines whether or not the divided region R1 is the attached region. More specifically, the determiner 24 determines whether or not the counter value of the divided region R1 in the current frame I1 is equal to or greater than the predetermined counter value. The predetermined counter value is the predetermined value.

In a case where the counter value of the divided region R1 in the current frame I1 is equal to or greater than the predetermined counter value, the determiner 24 determines that the divided region R1 is the attached region. In other words, the determiner 24 determines that the divided region R1 continuously satisfying the predetermined conditions, as the attached region. In a case where the counter value of the divided region R1 in the current frame I1 is smaller than the predetermined counter value, the determiner 24 determines that the divided region R1 is not the attached region and determines the divided region R1 as the unattached region.

Hysteresis may be provided to the predetermined counter value. In other words, a predetermined counter value that is used to change a determination of the divided region R1 from the unattached region to the attached region may be different from a predetermined counter value that is used to change a determination of the divided region R1 from the attached region to the unattached region.

The determiner 24 determines whether or not all the plurality of divided regions R1 in the current frame I1 have been determined to satisfy or dissatisfy the predetermined conditions.

Further, the determiner 24 determines whether or not the attached object M is on the lens of the on-vehicle camera 10. More specifically, the determiner 24 determines whether or not the occupation percentage is equal to or greater than a predetermined occupation percentage. The predetermined occupation percentage is a predetermined value, for example, 40%. In a case where the occupation percentage is equal to or greater than the predetermined occupation percentage, the determiner 24 determines that the attached object M is on the lens of the on-vehicle camera 10. In a case where the occupation percentage is smaller than the predetermined occupation percentage, the determiner 24 determines that the attached object M is not on the lens of the on-vehicle camera 10.

The detector 25 detects, as the attached region, the divided region R1 determined to have the attached object M. Further, the detector 25 detects, as the unattached region, the divided region R1 determined not to have the attached object M.

In a case where the vehicle speed is greater than the predetermined vehicle speed, or where the current frame I1 is the low light image, the detector 25 does not detect the attached region from the divided region R1 in the current frame I1.

In a case where the attached object M has been determined to be on the lens of the on-vehicle camera 10, the detector 25 detects attachment of the attached object M on the lens of the on-vehicle camera 10. More specifically, in the case where the attached object M has been determined to be on the lens of the on-vehicle camera 10, the detector 25 turns on an attached object detection flag. Further, in a case where the attached object M has been determined not to be on the lens of the on-vehicle camera 10, the detector 25 turns off the attached object detection flag.

In addition, in the case where the current frame I1 is the low light image, the detector 25 turns off the attached object detection flag.

The memory 3 is, for example, a RAM or a data flash memory. The RAM or the data flash memory stores the average luminance values of the divided regions R1, the luminance standard deviation of the divided regions R1, the counter values of the divided regions R1, threshold information of the first predetermined difference, information of programs, etc. The attached object detection apparatus 1 may obtain the foregoing programs and the information from a portable memory or from another computer connected to the attached object detection apparatus 1 via a wireless or wired network.

Figure 5:
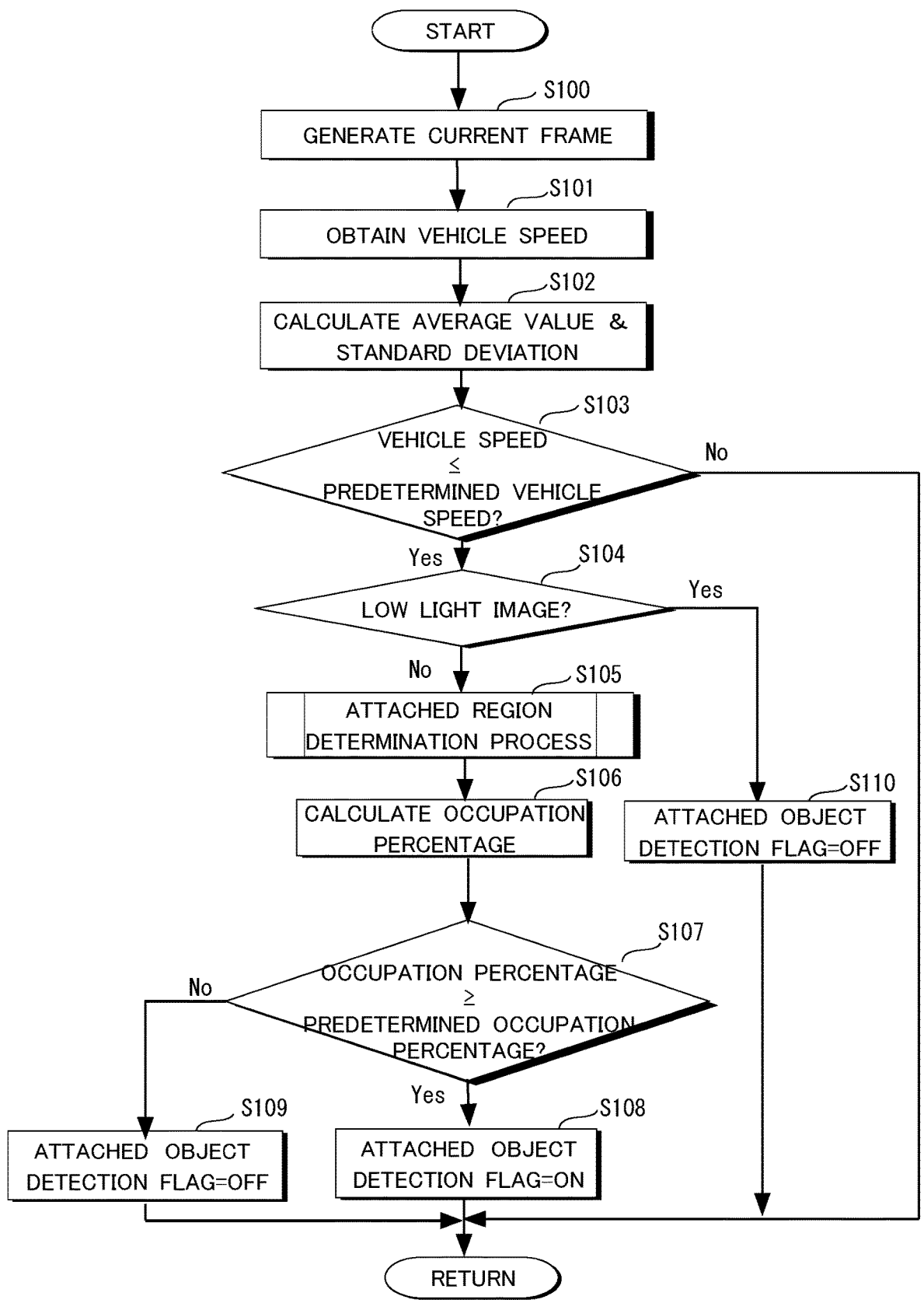
FIG. 5 is a flowchart of an attached object detection process.

Next, an attached object detection process of this embodiment will be described with reference to FIG. 5. FIG. 5 is a flowchart of the attached object detection process. The attached object detection process is performed in the on-vehicle cameras 10.

The attached object detection apparatus 1 generates the current frame I1 from the captured image captured by the on-vehicle camera 10 (a step S100). The attached object detection apparatus 1 obtains the vehicle speed (a step S101).

The attached object detection apparatus 1 calculates the average luminance value of the target region R0 in the current frame I1, the luminance standard deviation of the target region R0 in the current frame I1, the average luminance value for each divided region R1 in the current frame I1, and the luminance standard deviation for each divided region R1 in the current frame I1 (a step S102).

The attached object detection apparatus 1 determines whether or not the vehicle speed is equal to or smaller than the predetermined vehicle speed (a step S103). In the case where the vehicle speed is equal to or smaller than the predetermined vehicle speed (Yes in the step S103), the attached object detection apparatus 1 determines whether or not the current frame I1 is the low light image (a step S104). In the case where the vehicle speed is greater than the predetermined vehicle speed (No in the step S103), the attached object detection apparatus 1 end the process.

In a case where the current frame I1 is not the low light image (No in the step S104), i.e., in a case where the current frame I1 is the non-low light image, the attached object detection apparatus 1 performs an attached region determination process (a step S105). The attached region determination process will be described later.

The attached object detection apparatus 1 calculates the occupation percentage of the current frame I1 (a step S106). The attached object detection apparatus 1 determines whether or not the occupation percentage is equal to or greater than the predetermined occupation percentage (a step S107).

In a case where the occupation percentage is equal to or greater than the predetermined occupation percentage (Yes in the step S107), the attached object detection apparatus 1 turns on the attached object detection flag (a step S108). In a case where the occupation percentage is smaller than the predetermined occupation percentage (No, in the step S107), the attached object detection apparatus 1 turns off the attached object detection flag (a step S109).

In the case where the current frame I1 is the low light image (Yes in the step S104), the attached object detection apparatus 1 turns off the attached object detection flag (a step S110). In other words, in the case where the current frame I1 is the low light image, the attached object detection apparatus 1 does not perform the attached region determination process so that the attached object detection apparatus 1 does not detect the attached region of the divided region R1.

Figure 6:
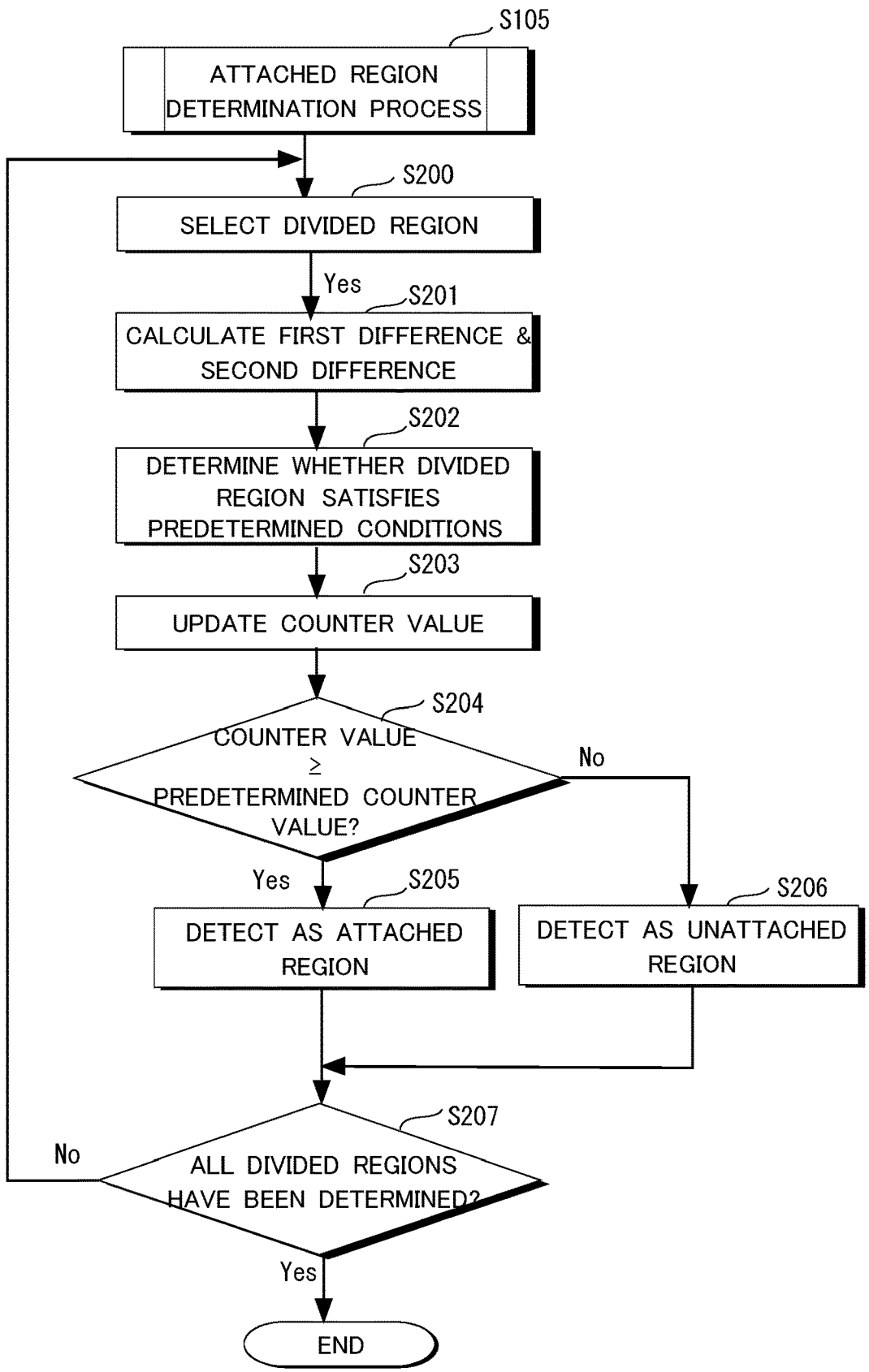
FIG. 6 is a flowchart of an attached region determination process.

Next, the attached region determination process will be described with reference to FIG. 6. FIG. 6 is a flowchart of the attached region determination process.

The attached object detection apparatus 1 selects one of the plurality of divided regions R1 (a step S200). More specifically, the attached object detection apparatus 1 selects one divided region R1 that has not been determined to satisfy or dissatisfy the predetermined conditions, amongst the plurality of divided regions R1 in the current frame I1.

The attached object detection apparatus 1 calculates the first difference and the second difference of the selected divided region R1 (a step S201). The attached object detection apparatus 1 may preliminarily calculate and store the first and second differences for each divided region R1, and may read out the first and second differences of the selected divided region R1.

The attached object detection apparatus 1 determines whether or not the divided region R1 satisfies the predetermined conditions (a step S202). The attached object detection apparatus 1 updates the counter value of the divided region R1 based on the determination result (a step S203). More specifically, in the case where the divided region R1 satisfies the predetermined conditions, the attached object detection apparatus 1 increases the counter value of the divided region R1. In the case where the divided region R1 does not satisfy the predetermined conditions, the attached object detection apparatus 1 decreases the counter value of the divided region R1.

The attached object detection apparatus 1 determines whether or not the counter value is equal to or greater than the predetermined counter value (a step S204). In the case where the counter value is equal to or greater than the predetermined counter value (Yes in the step S204), the attached object detection apparatus 1 detects the divided region R1 as the attached region (a step S205). In the case where the counter value is smaller than the predetermined counter value (No in the step S204), the attached object detection apparatus 1 detects the divided region R1 as the unattached region (a step S206).

In a case where all the divided regions R1 have been determined to satisfy or dissatisfy the predetermined conditions (Yes in a step S207), the attached object detection apparatus 1 ends the attached region determination process. In a case where there is a divided region R1 that has not been determined to satisfy or dissatisfy the predetermined conditions (No in the step S207), the attached object detection apparatus 1 selects an undetermined divided region R1 (the step S200), and repeats the foregoing process.

The attached object detection apparatus 1 determines whether or not the divided region R1 satisfies the predetermined conditions based on the average luminance value and the luminance standard deviation of the divided region R1. Then, the attached object detection apparatus 1 detects the divided region R1 satisfying the predetermined conditions, as the attached region.

Thus, the attached object detection apparatus 1 accurately detects attachment of the attached object M on the plurality of divided regions R1. Further, even in the case where the gain of the on-vehicle camera 10 is adjusted, the attached object detection apparatus 1 accurately detects the attachment of the attached object M on the plurality of divided regions R1. Therefore, the attached object detection apparatus 1 accurately detects the attachment of the attached object M on the lens of the on-vehicle camera 10.

The attached object detection apparatus 1 detects, as the attached region, the divided region R1 continuously satisfying the predetermined conditions, more specifically, the divided region R1 of which the counter value is continuously equal to or greater than the predetermined counter value.

Thus, by detecting, as the attached region, only the divided region R1 continuously satisfying the predetermined conditions, the attached object detection apparatus 1 accurately detects the attachment of the attached object M on the plurality of divided regions R1. As a result, the attached object detection apparatus 1 accurately detects the attachment of the attached object M on the lens of the on-vehicle camera 10.

The attached object detection apparatus 1 sets the first predetermine value that is used to determine whether or not the luminance of the divided region R1 in the current frame I1 is lower, based on the average luminance value of the target region R0 in the current frame I1.

Thus, in the case where the gain of the on-vehicle camera 10 is adjusted, the attached object detection apparatus 1 accurately detects the attachment of the attached object M on the plurality of divided regions R1. Therefore, the attached object detection apparatus 1 accurately detects the attachment of the attached object M on the lens of the on-vehicle camera 10.

In the case where the occupation percentage is equal to or greater than the predetermined occupation percentage, the attached object detection apparatus 1 determines that the attached object M is on the lens of the on-vehicle camera 10, and then turns on the attached object detection flag.

Thus, in the case where the attached object M is on the lens of the on-vehicle camera 10, the attached object detection apparatus 1 sends, to the devices 50, a signal indicating, for example, that the accurate information about the surroundings of the vehicle C cannot be obtained.

The attached object detection apparatus 1 calculates the occupation percentage, excluding the region showing the host vehicle C, and detects the attachment of the attached object M on the lens of the on-vehicle camera 10, based on the calculated occupation percentage.

Thus, the attached object detection apparatus 1 accurately detects the attachment of the attached object M on the lens of the on-vehicle camera 10.

In the case where the current frame I1 is the low light image, the attached object detection apparatus 1 does not perform the attached region determination process of the plurality of divided regions R1, and does not detect the attached region.

Thus, in a case where a surrounding environment of the vehicle C is dark, for example, at night or in a tunnel, the attached object detection apparatus 1 can prevent from wrongly detecting the attachment of the attached object M on the lens of the on-vehicle camera 10. Further, in a case where the current frame I1 is the low light image so that the attached region cannot be accurately detected, the attached object detection apparatus 1 can reduce a processing load by not performing the attached region determination process.

An attached object detection apparatus 1 of a modification may determine whether or not a divided region R1 is an attached region, without calculating a counter value of the divided region R1.

In a case where a vehicle C is travelling, more specifically, in a case where a vehicle speed of the vehicle C is equal to or greater than a predetermined low vehicle speed, the attached object detection apparatus 1 of the modification performs an attached region determination process. In other words, in the case where the vehicle C is travelling, the attached object detection apparatus 1 of the modification determines whether or not the divided region R1 satisfies a predetermined condition, and detects the attached region from the plurality of divided regions R1.

Thus, in a case where the vehicle C is parked and same captured images I are captured, the attached object detection apparatus 1 of the modification prevents from performing the attached region determination process. Therefore, the attached object detection apparatus 1 of the modification accurately detects attachment of the attached object M on the plurality of divided regions R1. Thus, the attached object detection apparatus 1 accurately detect the attachment of the attached object M on the lens of the on-vehicle camera 10.

In the attached object detection apparatus 1 of the modification, the first predetermined difference, the first predetermined value, etc. may be set for a process of adjusting luminance, color, brightness and the like, in addition to adjustment of the gain of the on-vehicle camera 10.

Further, in the attached object detection apparatus 1 of the modification, the first predetermined difference, the first predetermined value, etc. may be set for each on-vehicle camera 10.

Further effects and modifications can be derived easily by the person skilled in the art. Therefore, a broader mode of the invention is not limited to the foregoing specific description and typical embodiments. Thus, various changes are possible without departing from the sprit or scope of the general concept of the invention defined by the attached claims and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. An attached object detection apparatus, comprising:
   a setting part that sets a plurality of divided regions within a captured image captured by an image capturing apparatus;
   a calculator that calculates, for each of the plurality of divided regions and based on luminance of pixels in the divided region, a representative luminance value and an amount of luminance dispersion; and
   a detector that detects, as an attached region that has an attached object, a divided region among the plurality of divided regions that satisfies the following conditions:
   i) a first difference is equal to or smaller than a first predetermined difference, the first difference being a difference between a previous representative luminance value of a previous divided region and a current representative luminance value of a current divided region corresponding to the previous divided region, ii) a second difference is equal to or smaller than a second predetermined difference, the second difference being a difference between a previous amount of luminance dispersion of the previous divided region and a current amount of luminance dispersion of the current divided region, and iii) the representative luminance value of the current divided region is equal to or smaller than a first predetermined value.

2. The attached object detection apparatus according to claim 1, wherein
the calculator calculates an average luminance value as the representative luminance value and calculates a luminance standard deviation as the amount of luminance dispersion.

3. The attached object detection apparatus according to claim 1, wherein
the detector detects, as the attached region, the divided region of the plurality of divided regions continuously satisfying the following conditions:
i) the first difference is equal to or smaller than the first predetermined difference,
ii) the second difference is equal to or smaller than the second predetermined difference, and
iii) the representative luminance value of the current divided region is equal to or smaller than the first predetermined value.

4. The attached object detection apparatus according to claim 1, wherein
the calculator calculates a representative luminance value of a target region on which attachment of the attached object is to be detected, the target region including the plurality of the divided regions, and
the first predetermined value is set based on the representative luminance value of the target region.

5. The attached object detection apparatus according to claim 1, wherein
in a case where a ratio of the attached region to a target region on which attachment of the attached object is to be detected is equal to or greater than a predetermined percentage, the detector detects the attachment of the attached object on the image capturing apparatus, the target region including the plurality of divided regions.

6. The attached object detection apparatus according to claim 5, wherein
the image capturing apparatus is mounted on a vehicle; and
the detector detects the attachment of the attached object on the image capturing apparatus, excluding a region showing the vehicle in the captured image.

7. The attached object detection apparatus according to claim 1, wherein
in a case where the captured image is a low light image, the detector does not detect the attached region.

8. The attached object detection apparatus according to claim 1, wherein
the image capturing apparatus is mounted on a vehicle, and
in a case where the vehicle is travelling, the detector detects the attached region.

9. A method for detecting an attached object, the method comprising the steps of:
setting a plurality of divided regions within a captured image captured by an image capturing apparatus;
calculating, for each of the plurality of divided regions and based on luminance of pixels in the divided region, a representative luminance value and an amount of luminance dispersion; and
detecting, as an attached region that has an attached object, a divided region among the plurality of divided regions that satisfies the following conditions:
i) a first difference is equal to or smaller than a first predetermined difference, the first difference being a difference between a previous representative luminance value of a previous divided region and a current representative luminance value of a current divided region corresponding to the previous divided region,
ii) a second difference is equal to or smaller than a second predetermined difference, the second difference being a difference between a previous amount of luminance dispersion of the previous divided region and a current amount of luminance dispersion of the current divided region, and
iii) the representative luminance value of the current divided region is equal to or smaller than a first predetermined value.

10. A non-transitory computer readable storage medium storing instructions that, when executed by a processor, causes the processor to:
set a plurality of divided regions within a captured image captured by an image capturing apparatus;
calculate, for each of the plurality of divided regions and based on luminance of pixels in the divided region, a representative luminance value and an amount of luminance dispersion; and
detect, as an attached region that has an attached object, a divided region among the plurality of divided regions that satisfies the following conditions:
i) a first difference is equal to or smaller than a first predetermined difference, the first difference being a difference between a previous representative luminance value of a previous divided region and a current representative luminance value of a current divided region corresponding to the previous divided region,
ii) a second difference is equal to or smaller than a second predetermined difference, the second difference being a difference between a previous amount of luminance dispersion of the previous divided region and a current amount of luminance dispersion of the current divided region, and
iii) the representative luminance value of the current divided region is equal to or smaller than a first predetermined value.

* * * * *